United States Patent
Warren et al.

(10) Patent No.: US 8,875,089 B2
(45) Date of Patent: Oct. 28, 2014

(54) WORKSPACE MODEL FOR INTERRELATED PROJECTS

(75) Inventors: Matt Warren, Redmond, WA (US); Cyrus Najmabadi, Seattle, WA (US); Heejae Chang, Issaquah, WA (US); Jason Malinowski, Redmond, WA (US); Kevin Pilch-Bisson, Snohomish, WA (US); Dustin Campbell, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 471 days.

(21) Appl. No.: 13/310,799

(22) Filed: Dec. 5, 2011

(65) Prior Publication Data

US 2013/0145343 A1    Jun. 6, 2013

(51) Int. Cl.
*G06F 9/44* (2006.01)

(52) U.S. Cl.
CPC .... *G06F 8/36* (2013.01); *G06F 8/71* (2013.01)
USPC ............................. 717/101; 717/110; 717/120

(58) Field of Classification Search
CPC .......... G06Q 10/06; G06Q 10/10; G06F 8/10; G06F 8/20; G06F 8/34; G06F 8/38; G06F 8/71
USPC .................................................. 717/101, 105
See application file for complete search history.

(56) References Cited

U.S. PATENT DOCUMENTS

| | | | |
|---|---|---|---|
| 7,076,762 B2 | 7/2006 | Fisher | |
| 7,370,315 B1* | 5/2008 | Lovell et al. | 717/100 |
| 7,370,318 B1 | 5/2008 | Howe et al. | |
| 2004/0117759 A1* | 6/2004 | Rippert et al. | 717/100 |
| 2009/0094572 A1* | 4/2009 | Hegde et al. | 717/101 |
| 2009/0178031 A1* | 7/2009 | Zhao | 717/143 |
| 2009/0327324 A1 | 12/2009 | Laflen et al. | |
| 2010/0023926 A1 | 1/2010 | Sugawara et al. | |
| 2013/0111443 A1* | 5/2013 | Kedla et al. | 717/122 |

OTHER PUBLICATIONS

Frenzel, Leif, "The Language Toolkit: An API for Automated Refactorings in Eclipse-based IDEs", Retrieved at <<http://www.eclipse.org/articles/Article-LTK/ltk.html>>, Eclipse Magazine, vol. 5, Jan. 2006, pp. 4.

"Visual Studio Productivity Plug-in with Real Time Code Analysis", Retrieved at <<http://www.telerik.com/products/justcode.aspx>>, Retrieved Date: Sep. 15, 2011, pp. 2.

Widmer, Tobias, "Unleashing the Power of Refactoring", Retrieved at <<http://www.eclipse.org/articles/article.php?file=Article-Unleashing-the-Power-of-Refactoring/index.html>>. Eclipse Magazine, Jul. 4, 2006, pp. 12.

* cited by examiner

*Primary Examiner* — Qing Chen
*Assistant Examiner* — Andrew M Lyons
(74) *Attorney, Agent, or Firm* — Kevin Sullivan; Kate Drakos; Micky Minhas

(57) ABSTRACT

A workspace model generates a component of a solution from an immutable object representing the solution at a given point in time. A component may be requested by an extension to an integrated development environment for the extension's use. The workspace model determines a sequence of operations needed to construct the requested component at the time the component is requested using the state of the solution represented through the immutable object. The immutable object allows the extension to access the requested component while the integrated development environment is used to alter the solution.

20 Claims, 9 Drawing Sheets

700

WORKSPACE MODEL FOR INTERRELATED PROJECTS

BACKGROUND

An integrated development environment is used by programmers to develop a software application. The integrated development environment provides a set of resources that enables a programmer to create, edit, compile, debug and/or test source code written in multiple programming languages. The resources may include compilers, debuggers, editors, and/or libraries that facilitate the development of a software application within a single development environment. Additional tools or extensions may be plugged into the integrated development environment in order to extend the capabilities of the integrated development environment. These tools may perform code refactoring, static code analysis, and other functions not offered by the integrated development environment. An extension tool may analyze one or more of the source code files in order to improve the structural design of the interrelated programs. Such improvements may produce more efficiently structured source code that requires less memory or execution time thereby improving the performance of the software application. However, the tools have limited access to the internal resources that the integrated development environment utilizes which may be beneficial for an extension tool.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An integrated development environment ("IDE") may be used to compile a software application containing numerous interrelated projects that may be packaged into a single executable file. The IDE represents a software application as a solution having various interrelated components. The IDE may contain a workspace model that enables an extension to access the components of the solution, such as compilation data structures and compilation tools, through the use of an immutable object representing the state of the solution at a particular point in time. In this manner, the extension and the integrated development environment may access the solution simultaneously without locking, requiring semaphores, or duplicating the entire current solution.

The workspace model constructs a component of a solution on demand as a component is requested. The construction of a component requires determining a sequence of operations needed to construct the component including the construction of those components that the requested component depends on. The construction of a component may include reconstructing a component that was altered and using a component that currently exists.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
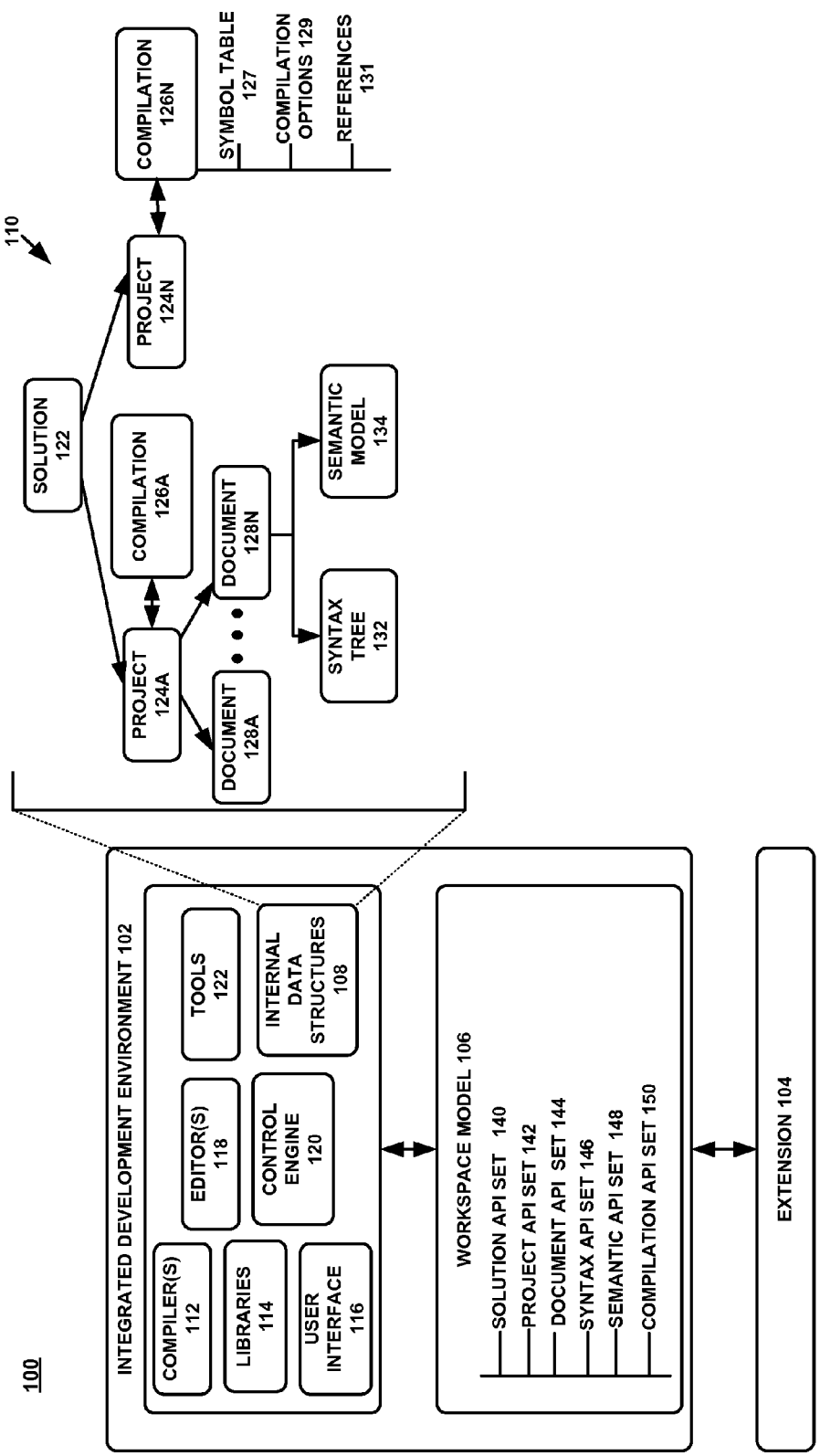
FIG. 1 illustrates an exemplary system employing a workspace model.

Various embodiments pertain to a technology that provides extension tools access to compilation tools (e.g., parser, semantic analyzer, etc.) and compilation data structures (e.g., syntax tree, semantic model, symbol table, etc.) used in the compilation of a software application having multiple interrelated projects. A compiled software application may be represented as a solution having multiple components that are interrelated having dependencies between the components. A request for a component of a solution includes the construction of the requested component and the various components that the requested component depends on. The components are constructed on demand when requested and through the use of an immutable object that captures the state of the solution at a given point in time. In this manner, the solution may be modified while the requested component is being constructed.

An integrated development environment is used to compile a software application containing numerous interrelated projects that may be packaged into a single executable file. The integrated development environment may structure a software application as a solution having multiple projects, where each project is a collection of related documents. A document may be a source code file, a script file, a template, a form, a reference (e.g., .dll file) and so forth. Each project may have dependencies that may require a recompilation of one or more components of a solution when a component is altered.

A compiler utilizes various tools to analyze source code. The compiler tools may include a lexical analyzer, a parser, a syntax analyzer, and a semantic analyzer. The compiler tools generate internal data structures that represent the source code, such as a syntax tree, a semantic model, and a symbol table. Each document contains the internal data structures associated with a document and each project contains compilation metadata that may include references to other projects, library references, APIs to other projects, external references to third party libraries not contained in a solution, and so forth.

The integrated development environment generates a solution whenever a new project is created and adds other projects to the solution as needed. The integrated development environment manages the solution which constantly changes whenever a user types data into the integrated development environment. An extension is also able to access various components of the solution at various points in time. As such, the solution may be used by both the integrated development environment and the extension simultaneously.

The workspace model contains a set of APIs that enables the extension to access a snapshot or state of a component at a particular point in time. The state may be an instance of one or more classes that represent the component. In this manner, the extension may access the solution as of a particular point in time while the integrated development environment continues to update the solution simultaneously without locking or duplicating the solution.

When a request for a component of the solution is made, the workspace model determines the sequence of operations needed to generate the component from the state of the solution at the time the request is made. In determining the sequence of operations, the workspace model considers dependencies on the requested component that may need to be constructed in order for the requested component to be made. In this manner, a user of the extension tool does not have to specify the formulation of the requested component rather simply asks for it. The workspace model automatically determines the sequence of operations needed to construct the requested component and the dependencies needed in its construction and then constructs the component which is provided to the extension.

Attention now turns to a further description of a system utilizing the workspace model. FIG. 1 illustrates a block diagram of an exemplary system 100 employing a workspace model. The system 100 may include an integrated development environment 102 and an extension 104. The integrated development environment 102 includes a workspace model 106 that enables the extension 104 to access a solution 110 which is a representation of the integrated development environment's internal data structures 108. Although the system 100 as shown in FIG. 1 has a limited number of elements in a certain configuration, it may be appreciated that the system 100 may include more or less elements in alternate configurations as desired for a given implementation.

The extension 104 may be one or more software programs that provide additional capabilities to a software application. An extension may be implemented as a snap-in, plug-in, add-on, component, and so forth. An integrated development environment 102 may contain multiple extensions. For example, an extension 104 may be a code refactoring tool, a spell checker, a static code analyzer, and so forth.

The integrated development environment 102 may be used to create, edit, compile, execute, debug, and/or test source code. The integrated development environment 102 may contain one or more compilers 112, libraries 114, a user interface 116, one or more editors 118, a control engine 120, tools 122, and numerous internal data structures 108. The compilers 112 are used to compile source code created in one or more source code languages (e.g., Visual Basic, Visual J#, C++, C#, F#, Java Script, APL, COBOL, Pascal, Eiffel, Haskell, ML, Oberon, Perl, Python, Scheme, Smalltalk and the like). The editor 118 enables a developer to edit a source code file. The tools 122 may provide a native code development environment or may provide a managed code development that runs on a virtual machine or may provide a combination thereof. The tools 122 may provide a managed code development environment using the .NET framework. The libraries 114 are a collection of software that may be binary files of compiled code, classes, type specifications, and so forth. The control engine 120 manages the operation of the integrated development environment 102.

During compilation, a compiler 112 performs a sequence of steps that converts the source code into a binary format. Each step performs a specific function and may generate an internal data structure containing information about the data and/or control flow of the program. The compiler 112 may utilize a lexical analyzer to scan the source code line-by-line and character-by-character to create a string of tokens. A parser then takes the string of tokens and generates a syntax tree representing the syntactic structure of the program in accordance with the grammar of a programming language.

A semantic analyzer uses the syntax tree to check the source code for semantic correctness which assures that all names (e.g., variables, functions, classes, namespaces, etc.) are used in accordance with the type system associated with the programming language. In particular, the semantic analyzer performs typing checking and type inference. Type checking ensures that expressions in the syntax tree are in compliance with the type system of the programming language. For those names not explicitly declared with a type, type inference is used to deduce a type for the value of an expression. The type system may be represented by a semantic model that may include the type system of the programming language associated with the source code and the type systems of external references incorporated into the source code. The semantic analyzer may generate a symbol table containing the names used in the source code and their corresponding type, scope level, and/or location within the source code.

The integrated development environment 102 may contain internal data structures 108 that represent a logical representation of a compiled software application having interrelated projects. In FIG. 1, a solution 110 is logically represented as a tree having a root, referred to as a solution node 122, and one or more child nodes, referred to as project nodes 124A-124N (collectively, '124'). Each project 124 is a parent to one or more child nodes, referred to as documents nodes 128A-128N (collectively, '128'), that represents documents associated with a project node 124. Each project 124 is associated with a compilation 126A-126N (collectively, '126') that may include a symbol table 127, compilation options 129 and references 131 (e.g., internal and external references) that are associated with the project. Each document node 128 is associated with a syntax tree 132 and a semantic model 134. A compilation 126 may include references to other projects, library references, APIs to other projects, external references to third party libraries not contained in a solution, and so forth.

In one or more embodiments, the extension utilizes a snapshot of the current solution taken at a specific point in time. The snapshot of the current solution may be implemented as an immutable object that may be accessed by one or more threads without locking (e.g., semaphores, etc.). In this manner, the IDE 102 may continue to update the current solution concurrently as the extension accesses the snapshot of the solution.

The workspace model 106 may be implemented as a collection of APIs that act on an object (i.e., instance of a class) that represents a node in the solution. A set of solution APIs 140 may be used to access a solution object that contains information regarding the solution and methods operating on the solution. A set of project APIs 142 may be used to determine each project in a solution, obtain metadata associated with a particular object, execute methods, and so forth. A set of document APIs 144 may be used to access source code or text of a document and to obtain metadata associated with a document.

The set of syntax APIs 146 provide access to a parser, a syntax tree, and utilities that construct the syntax tree associated with a particular document. There may be a SyntaxTree object that represents an entire parse tree, a SyntaxNode object that represents a declaration, statement, clause or expression in the syntax tree, a SyntaxToken object that represents a keyword, identifier, operator or punctuation in the syntax tree, and a SyntaxTrivia object that represents metadata such as whitespace between tokens, preprocessor directives, comments, etc.

The set of semantic APIs 148 provide access to the semantic model of a document. The semantic model may be used to determine the symbols referenced at a specific location in a source code file, the type of an expression (e.g., integer, Boolean, character, etc.), how variables flow in and out of a basic block, and so forth. The set of compilation APIs 150 provide access to a symbol table associated with a project, compiler options for a project, and references associated with a project.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

Figure 2:
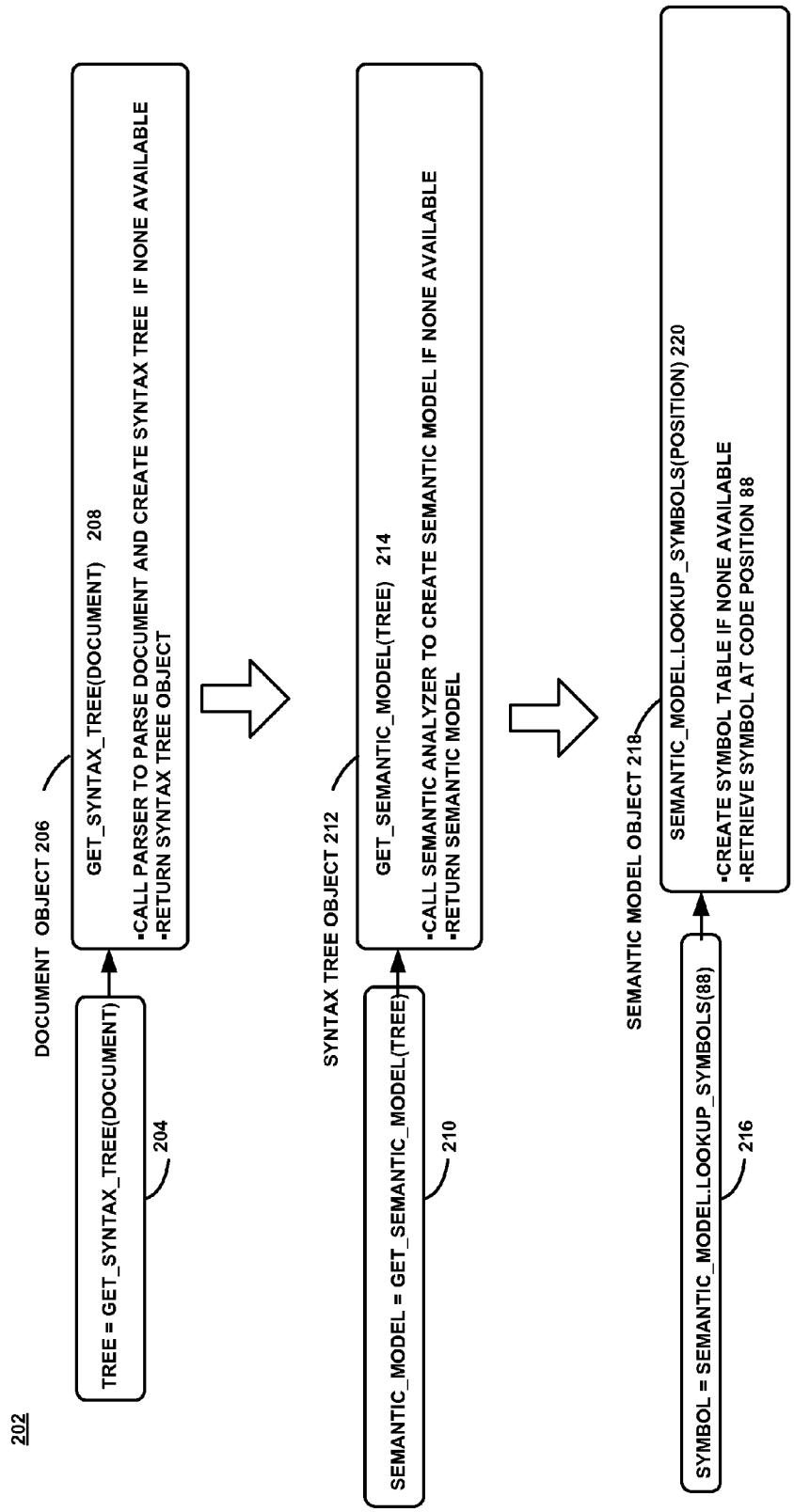
FIG. 2 illustrates a first exemplary use of the workspace model.

Attention now turns to an example illustrating the use of the workspace model. Referring to FIG. 2, there is shown a sequence of instructions used in an extension to obtain the symbols that are in scope at position 88 of a source code file. Code fragment 204 uses a GET_SYNTAX_TREE API to obtain a syntax tree object for DOCUMENT. The method associated with the GET_SYNTAX_TREE API may reside in the document object 206 associated with the DOCUMENT passed to the GET_SYNTAX_TREE API. The GET_SYNTAX_TREE method 208 may determine that the syntax tree for the document does not exist. In this case, the GET_SYNTAX_TREE method 208 may call the parser to parse the document in order to create the syntax tree. An object representing the syntax tree is then returned to the extension.

Next, code fragment 210 uses the GET_SEMANTIC_MODEL API to get the semantic model associated with the syntax tree. The method associated with the GET_SEMANTIC_MODEL API may reside in a syntax tree object 212. The GET_SEMANTIC_MODEL method 214 may determine that the semantic model for the syntax tree does not exist and call the semantic analyzer to create a semantic model object which is returned to the extension.

Next, code fragment 216 uses the semantic model object 218 to obtain the symbols located at position 88 of the source code (e.g., SEMANTIC_MODEL.LOOKUP_SYMBOLS (88)). However, the semantic model object 218 may not contain a symbol table for the project associated with the request and at this point, the symbol table is created. The LOOKUP_SYMBOLS method may require a compilation of all documents in the project in order to generate the symbol table if none exists. Once the symbol table is created, the symbols in scope at position 88 in the source code file are returned to the extension.

Figure 3:
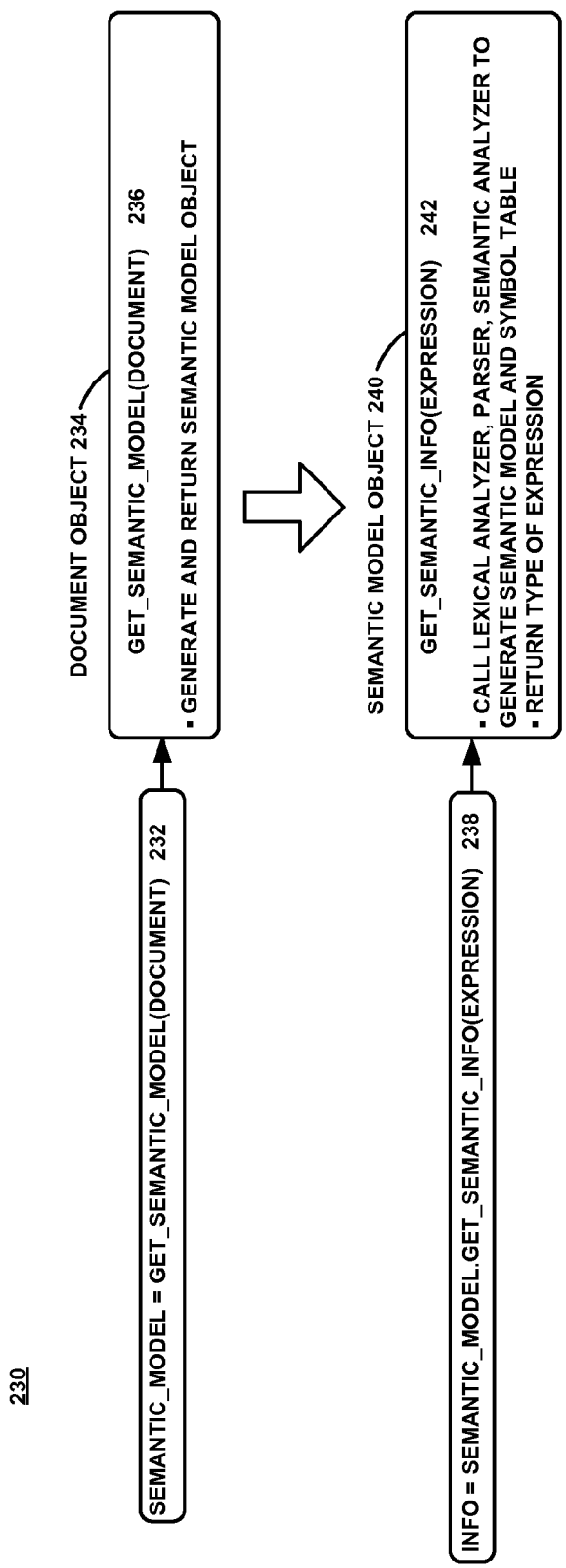
FIG. 3 illustrates a second exemplary use of the workspace model.

FIG. 3 illustrates another example of the workspace model where the semantic information associated with an expression, such as the type of the expression, is obtained. Code fragment 232 utilizes the GET_SEMANTIC_MODEL API to retrieve the semantic model object associated with DOCUMENT. The method 236 associated with the GET_SEMANTIC_MODEL API may reside in the document object 234 associated with DOCUMENT. The GET_SEMANTIC_MODEL method may generate and return a semantic model object 240. Code fragment 238 utilizes the semantic model object 240 to obtain the semantic information of EXPRESSION used in DOCUMENT. The GET_SEMANTIC_INFO method 242 may have to generate the semantic model if one does not exist already. In that case, the GET_SEMANTIC_INFO method 242 may have to create the semantic model which may consist of calling the lexical analyzer, parser, and semantic analyzer to generate the symbol table. The GET_SEMANTIC_INFO method 242 may then search for the expression in the symbol table to determine the associated type which is then returned to the expression.

As shown in FIGS. 2 and 3, the compilation data structures and operations are generated on demand. For example, a syntax tree for a document may not be generated until the extension utilizes the syntax tree to generate a symbol table as shown in FIG. 2. Likewise, in FIG. 3, a symbol table is constructed when the extension requests the semantic information needed for a particular symbol. The on-demand generation of a compilation data structure is done in order to delay the processing incurred in the generation of the compilation data structure until it is actually needed. This improves the overall performance of the IDE 102.

It is often the case that documents in one project refer to documents in another project. This creates a dependency between projects thereby making them interrelated. In order to construct a component of one project, a component of the interrelated project may need to be constructed first. The workspace model determines these dependencies and the existence and state of the interrelated components in generating the sequence of operations needed to construct the requested component.

Figure 4A:
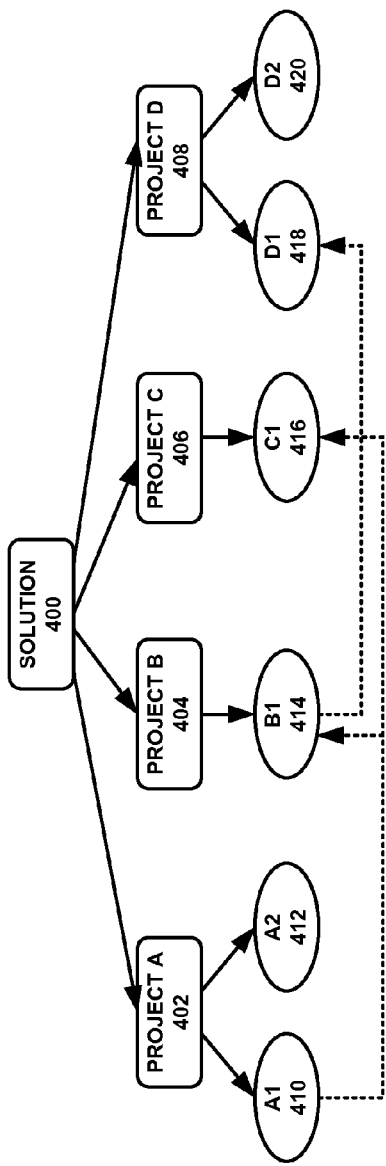
FIG. 4A illustrates an exemplary solution.

For example, referring to FIG. 4A, there is shown a solution 400, having Project A 402, Project B 404, Project C 406, and Project D 408. Project A 402 consists of two documents A1 410 and A2 412. Project B 404 consists of one document B1 414. Project C consists of one document C1 416. Project D 408 consists of two documents D1 418 and D2 420. Document A1 410 refers to a reference in document B1 414 and C1 416. Document B1 414 refers to a reference in document D1 418.

Figure 4B:
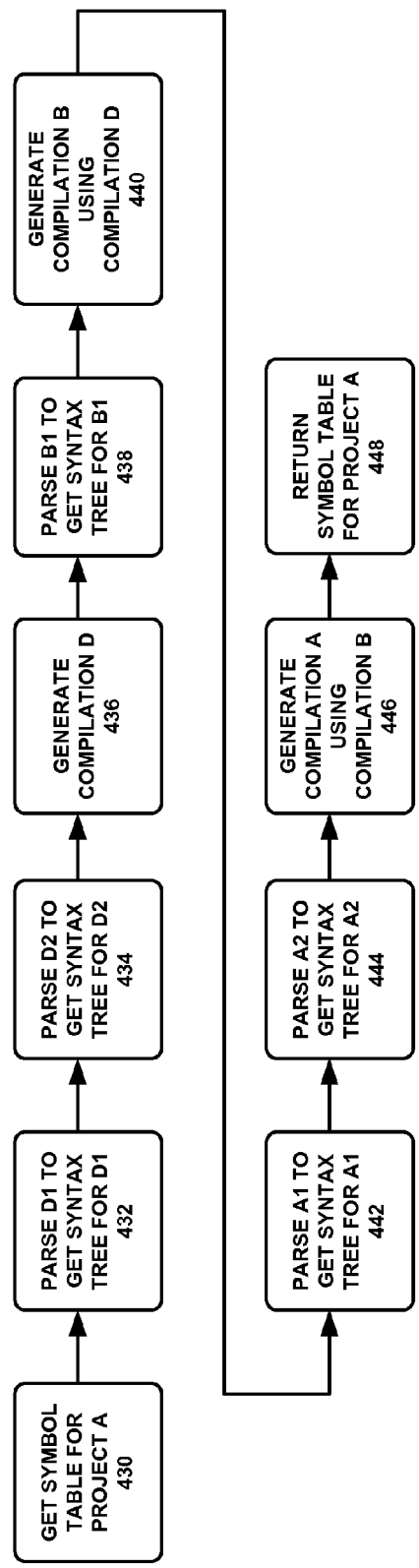
FIG. 4B illustrates an exemplary process for constructing a symbol table for project A shown in the solution of FIG. 4A.

As shown in FIG. 4B, the extension 104 may utilize the workspace model 106 to request a symbol table for Project A. The extension may utilize an API call to request the symbol table and is provided with the symbol table. However, the method invoked through the API call determines the dependencies between Project A and other projects in the solution in order to determine the sequence of operations needed to construct the symbol table for Project A. The workspace model provides an automated mechanism for determining the correct sequence of operations considering the dependencies or interrelations between projects in a solution.

Referring to FIGS. 4A-4B, a request is made through the workspace model for a component of the solution, which is the symbol table for Project A 402 (block 430). Since Project A 402 refers to a reference in Project B 404 and Project B 404 refers to a reference in Project D 408, a compilation of Project D 408 may be constructed first. The compilation of Project D 408 requires parse trees for both documents D1 418 and D2 420. If the parse trees for documents D1 418 and D2 420 currently exist, then they may be used. However, if the parse tree for either document D1 418 or D2 420 exists but has been changed recently or does not exist, then document D1 418 and/or D2 420, may be compiled thereby producing a respective parse tree (blocks 432, 434). Once the parse trees for documents D1 418 and D2 420 are available, Project D 408 may be compiled thereby generating a symbol table and a compilation for Project D 408 (block 436).

Next, the compilation of Project B 404 is constructed. The compilation of Project B 404 requires the compilation of document B1 414 which uses the compilation of Project D 408. The compilation of Project B 408 generates a symbol table and a compilation for Project B 408 (block 440).

Next, the compilation of Project A 402 is constructed. If the parse trees for documents A1 410 and A2 412 do not exist or exist but have been altered, then document A1 410 and/or A2 412 are compiled thereby generating their respective parse trees (blocks 442, 444). The compilation of Project A 402 is then constructed using the parse trees of documents A1 410 and A2 412 and the compilations of Projects B 404 and C 406 (block 446). The compilation of Project A 402 generates the symbol table for Project A 402 which is returned to the extension (block 448).

Attention now turns to a discussion of exemplary operations performed by the integrated development environment 102 and the extension 104. Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 5:
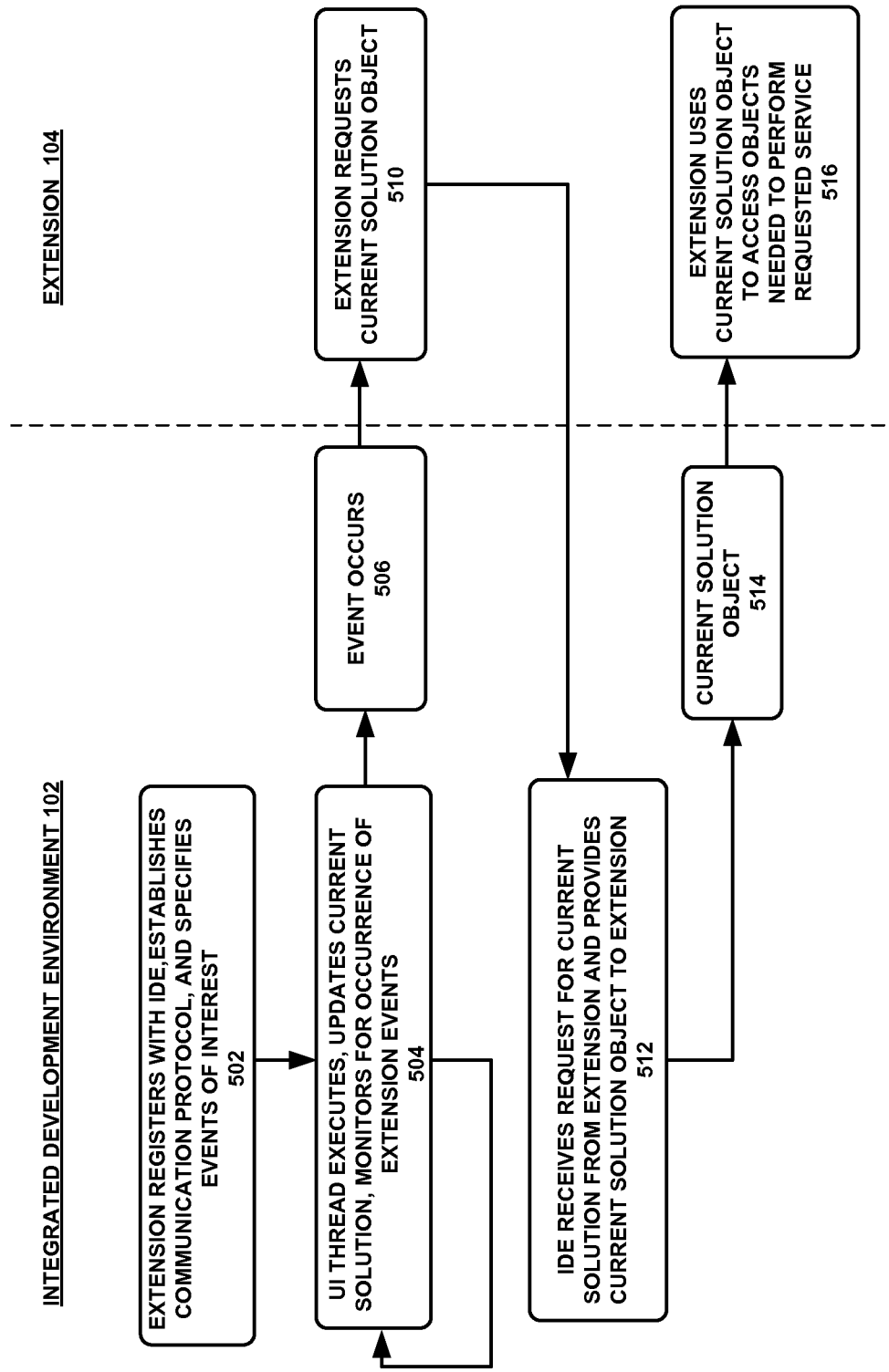
FIG. 5 is a flow diagram illustrating an exemplary method of the workspace model and the extension.

Referring to FIG. 5, the extension 104 may register with the IDE 102 specifying information that the extension wants from the IDE 102 and a protocol for communicating with the IDE 102 (block 502). For example, the extension may register with the integrated development environment 102 as a plug-in. As a plug-in, the extension may request that the IDE 102 provide the extension with access through the workspace model to the current solution and to provide such access when the user performs certain actions in the IDE 102 (block 502).

The IDE 102 may utilize a user interface (UI) thread to manage the IDE's user interface. The UI thread may be used to monitor for the occurrence of each event specified by the extension in addition to managing the user's input and updating the current solution in response to the user's actions (block 504). The UI thread notifies the extension when each such event occurs (block 506). For example, the extension may need to be informed when a certain menu or icon is pressed by the user that pertains to the extension, if the user has entered certain text that pertains to the extension, and so forth.

Upon receiving the notification from the UI thread, the extension 104 may request from the IDE 102, an immutable object that represents the current solution at that point in time (block 510). Upon receiving the request for the object (block 512), the IDE 102 returns a solution object to the extension 104 (block 514). The extension 104 utilizes the solution object to access the components of the solution as desired for an intended application (block 516). For example, as shown above, the extension 104 may request a symbol table associated with a project, a semantic model associated a project, and so forth.

Figure 6:
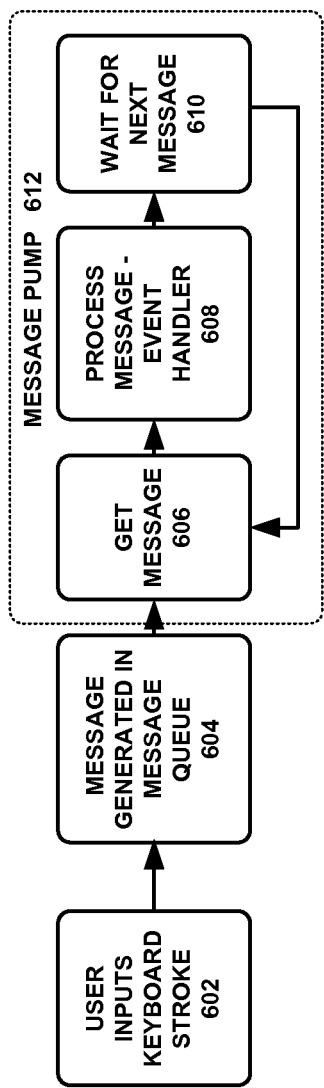
FIG. 6 is a flow diagram illustrating an exemplary method of a message pump.

Attention now turns to a brief discussion of the UI thread. Referring to FIG. 6, user actions, such as keystrokes and menu selection, are typically processed by a UI thread which manages the IDE's user interface. User interface events are represented as messages that are stored in a message queue until processed by the UI thread. The UI thread may be implemented as a message pump or loop that retrieves messages from a message queue and processes them accordingly. A goal of the UI thread is to continually retrieve messages from the message queue which is otherwise known in the art as pumping messages. In order to process messages from the message queue quickly, the methods invoked by the workspace model do not generate an entire solution rather generate a component on demand prior to its use. Otherwise, the message queue may be unnecessarily delayed in performing tasks that may not be needed.

In an embodiment, the UI thread may be implemented as a message pump. A message pump retrieves messages from a message queue which are then forwarded to a corresponding event handler for processing. A sequence of messages may be translated or aggregated into an event. For example, the mouse button down message and the move message may be aggregated into a window resize event. Examples of other events may include keyboard input, time expiration, and so forth. The UI thread calls the event handler associated with a message and waits for the completion of the execution of the event handler before retrieving another message.

A user may enter a keystroke (block 602) which is turned into a message that is placed into a message queue by an operating system (block 604). A message pump 612 processes the messages placed in the message queue. The message pump 612 may be a loop that continuously retrieves messages off the message queue through a Get Message function 606, then initiates processing of the message through a Process Message function 608, and waits for the next message to be placed on the message queue through the Wait For Next Message function 610.

Figure 7:
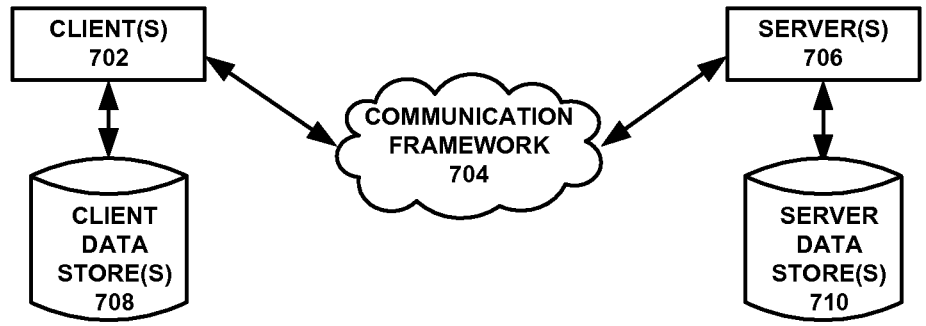
FIG. 7 is a block diagram illustrating an operating environment.

Attention now turns to a discussion of an exemplary operating environment. FIG. 7 illustrates a first operating environment 700. It should be noted that the operating environment 700 is exemplary and is not intended to suggest any limitation as to the functionality of the embodiments. The embodiment may be applied to an operating environment 700 having one or more client(s) 702 in communication through a communications framework 704 with one or more server(s) 706. The operating environment 700 may be configured in a network environment, a distributed environment, a multiprocessor environment, or a stand-alone computing device having access to remote or local storage devices.

In one or more embodiments, the integrated development environment and extension may be embodied in a client that is configured as a stand-alone computing device. In one or more alternate embodiments, the extension may be embodied in a client and the integrated development environment may be embodied in a server. However, the embodiments are not constrained to these configurations as other configurations may be used for an intended implementation.

A client 702 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 702 may also be embodied as a software module having instructions that execute in a single execution path, multiple concurrent execution paths (e.g., thread, process, etc.), or in any other manner.

A server 706 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 706 may also be embodied as a software module having instructions that execute in a single execution path, multiple concurrent execution paths (e.g., thread, process, etc.), or in any other manner.

The communications framework 704 facilitates communications between the client 702 and the server 706. The communications framework 704 may embody any type of communications medium, such as wired or wireless networks, utilizing any communication protocol. Each client(s) 702 may be coupled to one or more client data store(s) 708 that store information local to the client 702. Each server(s) 706 may be coupled to one or more server data store(s) 710 that store information local to the server 706.

Figure 8:
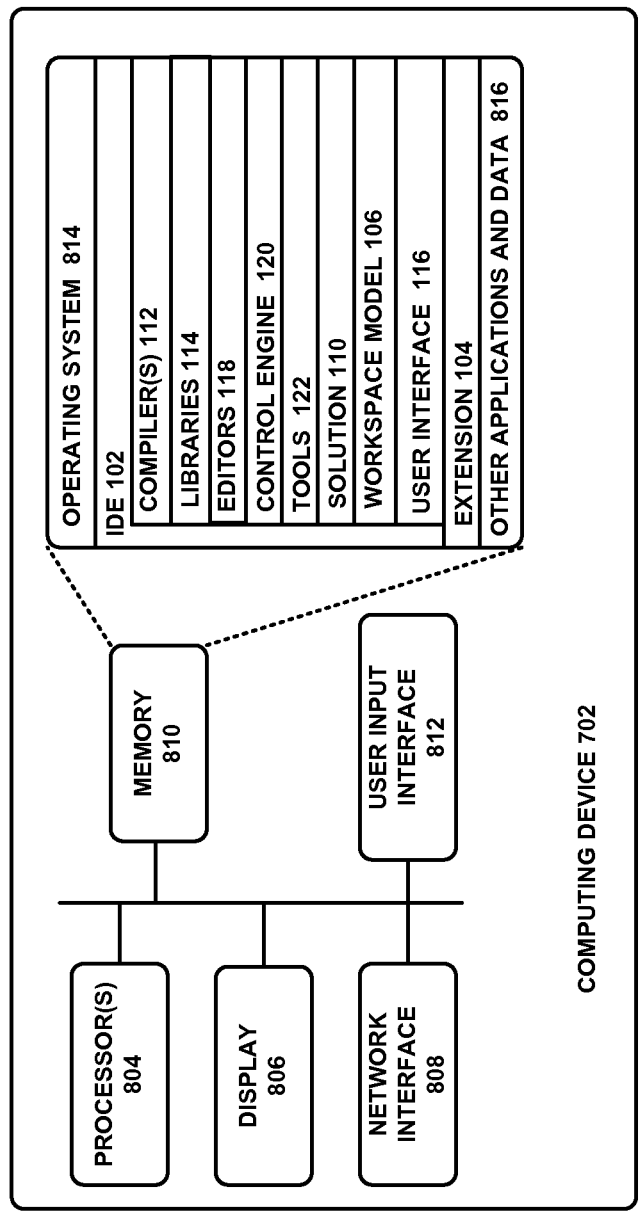
FIG. 8 is a block diagram illustrating an exemplary computing device.

FIG. 8 illustrates a block diagram of an exemplary computing device 702. The computing device 702 may have one or more processors 804, a display 806, a network interface 808, a memory 810, and a user input interface 812. A processor 804 may be any commercially available processor and may include dual microprocessors and multi-processor architectures. The display 806 may be any visual display unit. The network interface 808 facilitates wired or wireless communications between the computing device 702 and a communications framework. The user input interface 812 facilitates communications between the computing device 702 and input devices, such as a keyboard, mouse, etc.

The memory 810 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 810 may also include one or more external storage devices or remotely located storage devices. The memory may 810 contain instructions and data as follows:

an operating system 814;
an integrated development environment 102 having one or more compilers 112, libraries 114; editors 118; a control engine 120, tools 122, an internal data structure including a solution 110, a workspace model 106, and a user interface 116;
an extension 104; and
various other applications and data 816.

Figure 9:
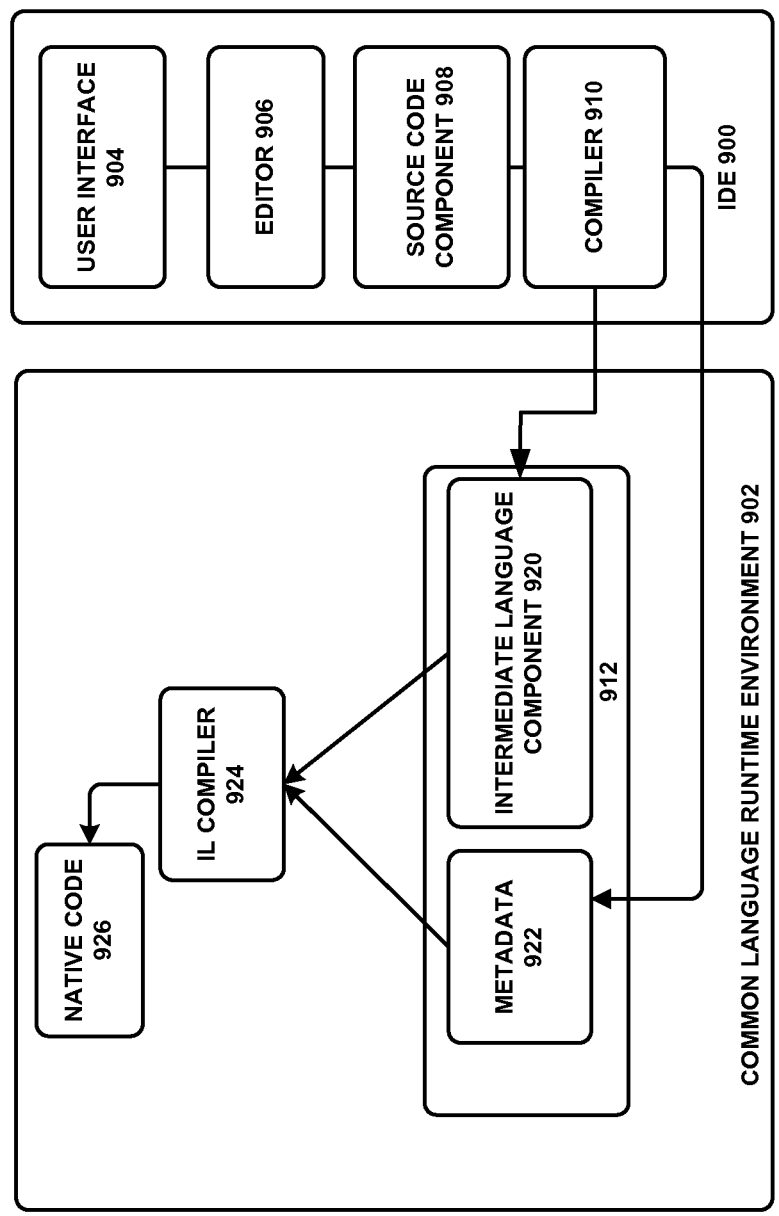
FIG. 9 is a block diagram illustrating an exemplary integrated development environment.

FIG. 9 illustrates an integrated development environment 900 and Common Language Runtime Environment 902. An IDE 900 may allow a user (e.g., developer, programmer, designer, coder, etc.) to design, code, compile, test, run, edit, debug or build a program, set of programs, web sites, web applications, and web services in a computer system. Software programs can include source code (component 908), created in one or more source code languages (e.g., Visual Basic, Visual C#, C++, C#, F#, Java Script, APL, COBOL, Pascal, Eiffel, Haskell, ML, Oberon, Perl, Python, Scheme, Smalltalk and the like). The IDE 900 may provide a native code development environment or may provide a managed code development that runs on a virtual machine or may provide a combination thereof.

The IDE 900 may provide a managed code development environment using the .NET framework. An intermediate language component 920 may be created from the source code component 908 and the native code component 926 using a language specific source compiler 910 and the native code component 926 (e.g., machine executable instructions) is created from the intermediate language component 920 using the intermediate language (IL) compiler 924 (e.g. just-in-time (JIT) compiler), when the application is executed. That is, when an intermediate language application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 904 and a source code editor 906 in the IDE 900. Thereafter, the source code component 908 can be compiled via a source compiler 910, whereby an intermediate language representation of the program may be created, such as assembly 912. The assembly 912 may comprise the intermediate language component 920 and metadata 922.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A computer-implemented method, comprising:
generating a solution, the solution constructed from at least one project that represents a separately compiled unit, each project constructed from at least one document requiring compilation and at least one compilation data structure;
receiving a request for a component of the solution, the component selected from one of another solution, a project, a document or a compilation data structure;
using an immutable object of the solution, taken at a given point in time, to determine a sequence of operations needed to generate the component requested; and
executing the sequence of operations to generate the component requested upon receipt of the request.

2. The computer-implemented method of claim 1, further comprising:
altering the solution while enabling access to the component requested.

3. The computer-implemented method of claim 1, further comprising:
generating the component requested by constructing another component that the component requested depends on that does not already exist.

4. The computer-implemented method of claim 1, further comprising:
generating the component requested by reconstructing another component that the component requested depends on and which has been changed.

5. The computer-implemented method of claim 1, further comprising:
generating the component requested by using another component that the component requested depends on which exists but has not been changed.

6. The computer-implemented method of claim 1,
wherein the component requested is associated with a first project;
wherein the component requested is dependent on a component associated with a second project, the first project different from the second project; and
wherein the sequence of operations includes operations performed on one or more components of the second project needed in order to perform operations needed to construct the component requested.

7. The computer-implemented method of claim 1, wherein the request for the component of the solution is facilitated through an API and execution of the sequence of operations to generate the component requested is facilitated through a method associated with the API.

8. The computer-implemented method of claim 1,
wherein the component requested is a first compilation data structure associated with a first project;
wherein the compilation data structure depends on a second compilation data structure associated with a second project; and
wherein the sequence of operations includes operations performed to generate the second compilation data structure in order to construct the first compilation data structure.

9. The computer-implemented method of claim 1,
wherein the component requested is a first component associated with a first project;
wherein the first component depends on a second component associated with a second project; and
wherein the sequence of operations includes operations performed to generate the second component in order to construct the first component.

10. The computer-implemented method of claim 1,
wherein the component requested is a first component associated with a first project;
wherein the first component depends on a second component associated with the first project; and
wherein the sequence of operations includes operations performed to generate the second component in order to construct the first component.

11. A system, comprising:
at least one processor and at least one memory, the at least one memory including:
an integrated development environment having a solution and a workspace;
the solution constructed from a compilation of one or more projects interrelated to form an executable unit, each project constructed from at least one document requiring compilation and at least one compilation data structure;
wherein the workspace allows a component of the solution to be accessed by an extension to the integrated development environment, the component selected from one of another solution, a project, a document or compilation data structure;
wherein the integrated development environment generates an immutable object representing the solution at a point in time, the immutable object used to generate a component of the solution that is requested by the extension; and
wherein the integrated development environment allows alteration of the solution while the extension accesses the requested component through the workspace using the immutable object.

12. The system of claim 11, wherein the workspace generates the requested component at the time the extension requests the requested component.

13. The system of claim 12, wherein the workspace generates the requested component by using one or more of existing components that the requested component depends on that have not been altered, by reconstructing existing components that the requested component depends on that have been altered, or by constructing components that the requested component depends on that do not exist.

14. The system of claim 12, wherein the workspace generates the requested component associated with a first project by constructing one or more components associated with a second project.

15. A computer-readable storage medium, not being a signal per se, storing thereon processor-executable instructions that when executed on at least one processor perform actions, comprising:
generating a solution, the solution constructed from at least one project that represents a separately compiled unit, each project constructed from at least one document requiring compilation and at least one compilation data structure;
receiving a request for a component of the solution, the component selected from one of another solution, a project, a document or a compilation data structure;
using an immutable object of the solution, taken at a given point in time, to determine a sequence of operations needed to generate the component requested; and
executing the sequence of operations to generate the component requested upon receipt of the request.

16. The computer-readable storage medium of claim 15, further comprising:
   altering the solution while enabling access to the component requested.

17. The computer-readable storage medium of claim 15, further comprising:
   generating the component requested by constructing another component that the component requested depends on that does not already exist.

18. The computer-readable storage medium of claim 15, further comprising:
   generating the component requested by reconstructing another component that the component requested depends on and which has been changed.

19. The computer-readable storage medium of claim 15, further comprising:
   generating the component requested by using another component that the component requested depends on which exists but has not been changed.

20. The computer-readable storage medium of claim 15,
   wherein the component requested is associated with a first project;
   wherein the component requested is dependent on a component associated with a second project, the first project different from the second project; and
   wherein the sequence of operations includes operations performed on one or more components of the second project needed in order to perform operations needed to construct the component requested.

\* \* \* \* \*